US008645934B2

(12) United States Patent
Fontenot et al.

(10) Patent No.: US 8,645,934 B2
(45) Date of Patent: Feb. 4, 2014

(54) SIMULTANEOUS COMPILER BINARY OPTIMIZATIONS

(75) Inventors: Nathan Fontenot, Georgetown, TX (US); Michael Thomas Strosaker, Austin, TX (US); Joel Howard Schopp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 12/775,176

(22) Filed: May 6, 2010

(65) Prior Publication Data
US 2011/0276954 A1    Nov. 10, 2011

(51) Int. Cl.
*G06F 9/45*    (2006.01)

(52) U.S. Cl.
USPC ........................... 717/151; 717/140; 717/159

(58) Field of Classification Search
None
See application file for complete search history.

(56) References Cited

U.S. PATENT DOCUMENTS

| 5,835,775 | A | 11/1998 | Washington et al. |
| 6,289,505 | B1 | 9/2001 | Goebel |
| 7,140,010 | B2 | 11/2006 | Tirumalai et al. |
| 7,146,607 | B2 | 12/2006 | Nair et al. |
| 7,480,901 | B2 | 1/2009 | Arenburg et al. |
| 7,543,282 | B2 | 6/2009 | Chou |
| 7,814,467 | B2 * | 10/2010 | Li et al. ........................ 717/151 |
| 2004/0083462 | A1 * | 4/2004 | Gschwind et al. ............ 717/140 |
| 2004/0088690 | A1 | 5/2004 | Shaul |
| 2005/0071828 | A1 | 3/2005 | Brokenshire et al. |
| 2007/0079303 | A1 * | 4/2007 | Du et al. ........................ 717/151 |
| 2007/0300213 | A1 * | 12/2007 | Adolphson et al. ........... 717/151 |
| 2008/0028373 | A1 * | 1/2008 | Yang et al. .................... 717/140 |
| 2009/0164982 | A1 | 6/2009 | Lobo |
| 2009/0249277 | A1 | 10/2009 | Prakash |
| 2011/0010696 | A1 * | 1/2011 | Lobo et al. .................... 717/151 |

* cited by examiner

*Primary Examiner* — Elias Mamo
(74) *Attorney, Agent, or Firm* — Thomas E. Tyson; Steven L. Bennett

(57) ABSTRACT

The present invention provides a method to optimize object code files produced by a compiler for several different types of target processors. The compiler divides the source code to be compiled into several functional modules. Given a specified set of target processors, each functional module is compiled resulting in a target object version for each target processor. Then, for each functional module, a merging process is performed wherein identical target object versions or target object versions with similar contents are merged by deleting the identical or similar versions. After this merging process, a composite object code file is formed containing all of the non-deleted target object versions of the function modules.

11 Claims, 4 Drawing Sheets

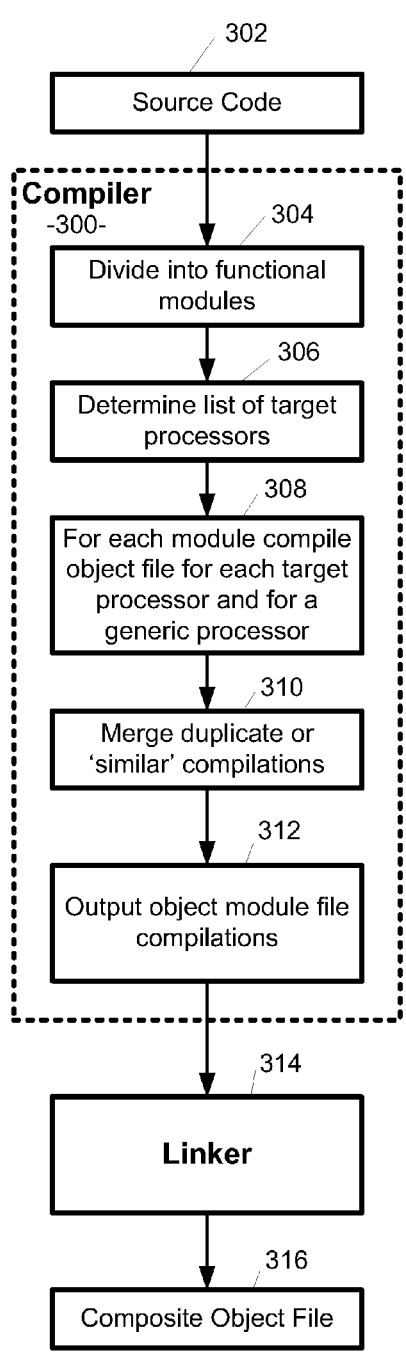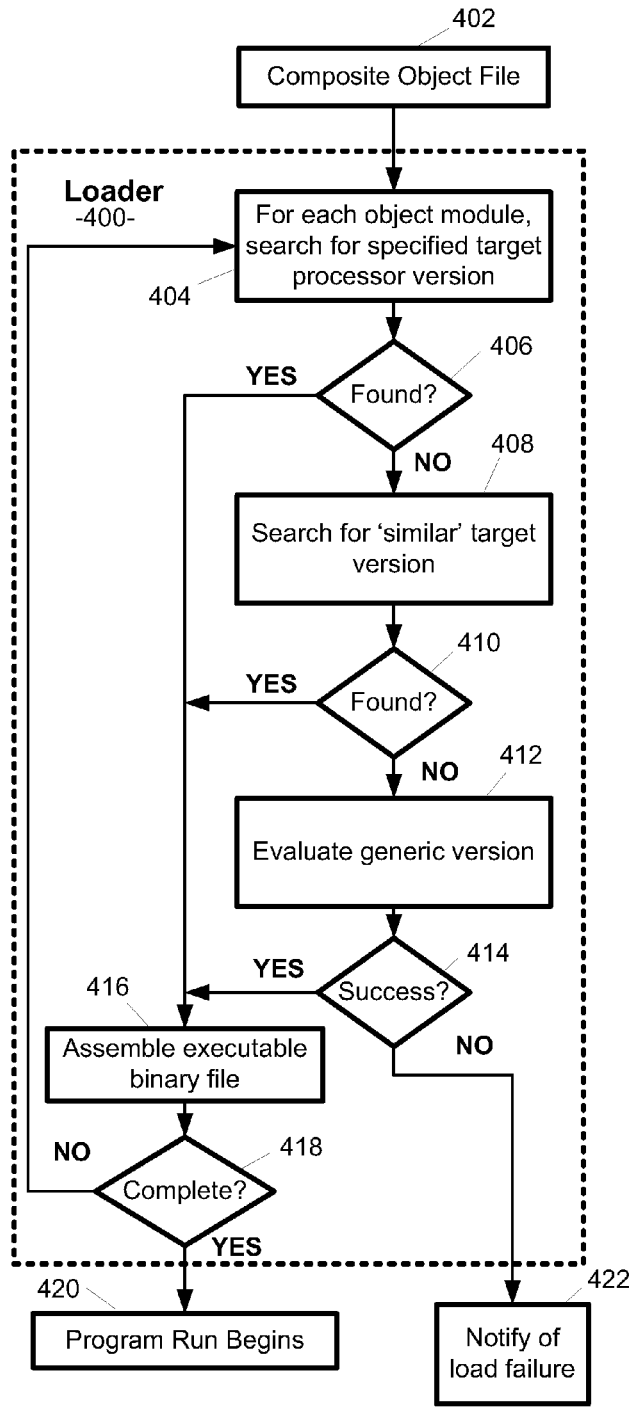
Figure 3
Figure 4

SIMULTANEOUS COMPILER BINARY OPTIMIZATIONS

BACKGROUND OF THE INVENTION

1. Technical Field

The present invention relates to computer program compilation. In particular, the present invention relates to optimizing compiled binary files.

2. Description of the Related Art

Typically computer programmers create software programs in source code using a high level language such as C but such programs can not be directly performed by a computer. A compiler is a program which transforms a high level language source code program into a binary program of the form that can be used directly by a computer. Since there are many types of computer processors, a compiler must provide a binary program that is directed to the specific computer processor that will run the program. The receiving computer processor is termed the target processor. If a program is to be distributed to a number of computer processors, several different program compilations must be performed in order provide the appropriate binary programs for each different computer processor.

There are examples of current computer systems such as those manufactured by Apple Computer, Incorporated that use two different types of processor architectures, one of a PowerPC architecture from IBM and one from Intel. A program intended to be used on an Apple computer must provide both compiled binary programs since one binary version will not be compatible with a different processor architecture.

Another consideration in compilation is optimization of the compiled binary code to run as quickly and efficiently as possible on its target computer processor system. Since there are several different types of processor architectures and several different implementations of each processor architecture, providing compiled optimized binary programs for these different processor architectures and their implementations result in a large number of different binary files for a program.

SUMMARY

In accordance with the present invention, a method is provided compile a source code program into several object code files for several target processors where the method includes the steps of dividing the source code program into functional modules; for each functional module, compiling the functional module to provide a target object version of that functional module for each target processor; for each functional module, merging the target object versions by deleting any identical target object versions or ones that have similar contents; and after merging, forming a composite object code file of all remaining target object versions of the function modules.

BRIEF DESCRIPTION OF THE DRAWINGS

The present invention may be better understood, and its numerous objects, features, and advantages made apparent to those skilled in the art by referencing the accompanying drawings.

FIG. 3 is a flow chart of the compiler process;

FIG. 4 is a flowchart of the executable binary file loading process;

DETAILED DESCRIPTION

Figure 1:
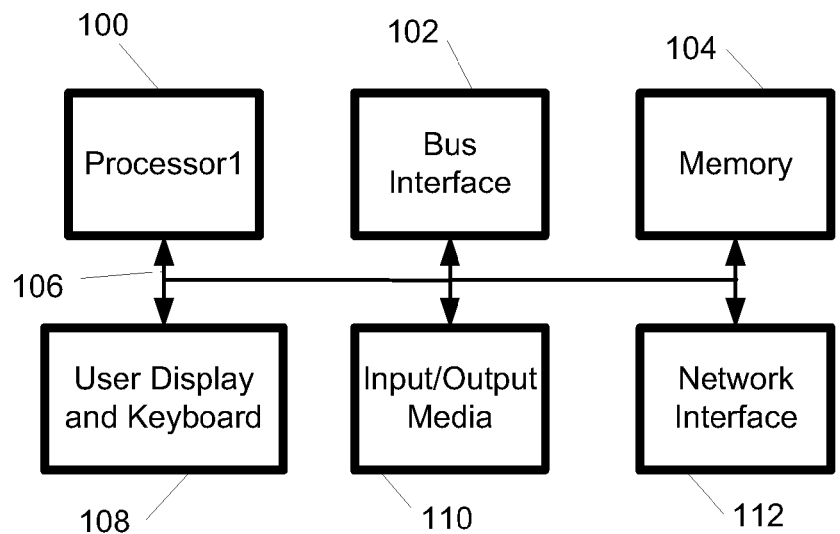
FIG. 1 is a block diagram of a single processor computer system.

The following is intended to provide a detailed description of an example of the invention and should not be taken to be limiting of the invention itself. Rather, any number of variations may fall within the scope of the invention, which is defined in the claims following the description.

The present invention is a method, a data processing system and a computer program product that compiles a source code program into a several object code files where the method includes the steps of dividing the source code program into functional modules; determining the set of target processors for which the object code files are to be run; for each functional module, compiling the functional module to provide a target object version of that functional module for each target processor; for each functional module, merging the target object versions by deleting any identical target object versions or ones that have similar contents; and after merging, forming a composite object code file of all remaining target object versions of the function modules.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may be implemented entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are implemented via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are implemented on the computer or other programmable apparatus provide processes for implementing the functions/acts specified in the flowchart and/or block diagram block or blocks.

Figure 2:
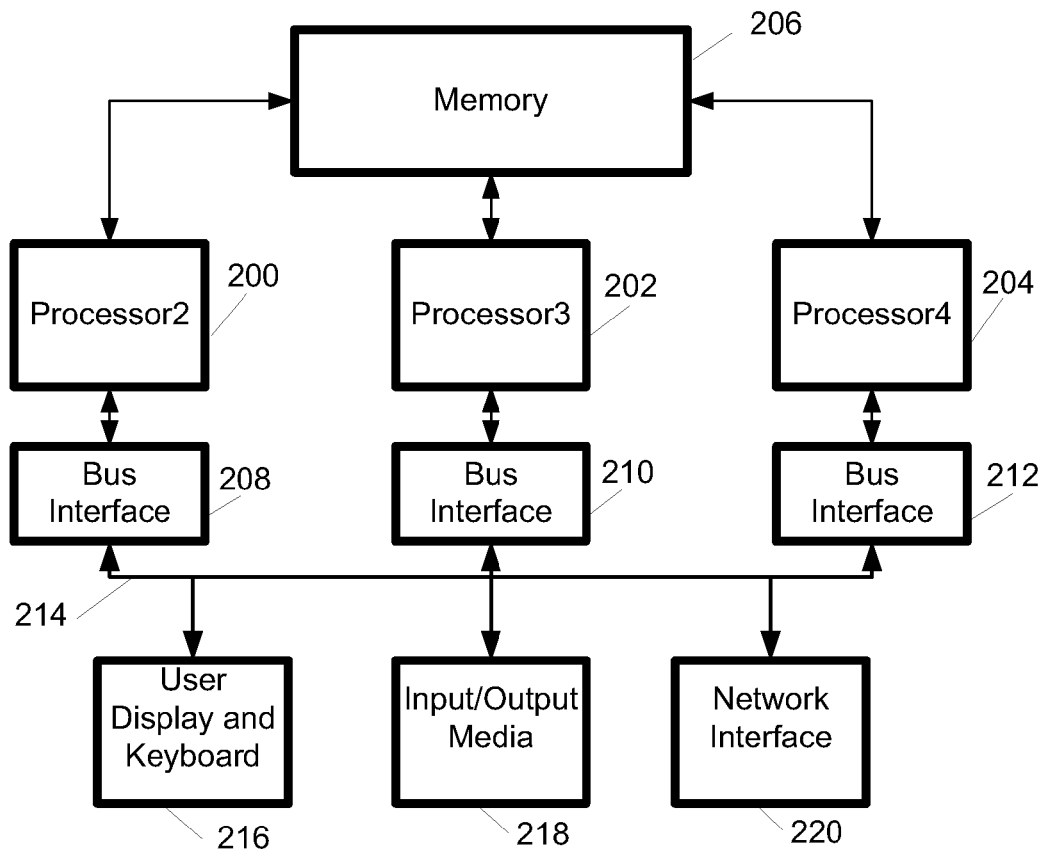
FIG. 2 is a block diagram of a multiple processor computer system.

The compiler of this present invention is suitable to run on a single processor computer system such as illustrated in FIG. 1. Processor1 100 is connected to an information bus 106 which connects to a bus interface 102, a memory 104, a network interface 112, an input/output media peripheral device 110, and a display and keyboard 108. A compiler running on processor1 100 provides object code that can be communicated over the network interface 112, stored in memory 104, provided to bus connected peripheral devices (not shown) over a bus interface 102, or provided on a magnetic tape or a compact disk through the input/output media peripheral device 110. The compiler does not necessarily have to provide object code for the same type of processor as Processor1 100. Rather the compiler can provide object code for several different types of processors termed target processors. Commonly this type of compiler is referred to as a cross compiler. As an example, a three processor system is illustrated in FIG. 2. This three processor system consists of processor2 200, processor3 202, and processor4 204 that are respectively connected to bus interfaces 208, 210, at 212. Likewise processor2 200, processor3 202, and processor4 204 are connected to a common memory 206. As is typical for such a multiprocessor system, an information bus 214 is connected to bus interfaces 208, 210, and 212 providing the processors access to the user displaying and keyboard 216, and an input/output media peripheral 218 and a network interface 220.

FIG. 3 is a software flow chart diagram illustrating the operation of the compiler. In FIG. 3, compiler 300 includes several components. A source code program 302 is provided to the compiler 300 and the first step in this compilation process is to divide the source code program into several functional modules in step 304. The functional modules consist of single function code, such as in C, or arithmetic functions, such as in Fortran, or subroutines. This step is performed during a compiler parsing operation. In step 306, a list of target processors is provided. Commonly this is provided by a user executing the compiler or it may be a default set of target processors provided with the compiler that may include an enumerated list of processors such as for PowerPC, PowerPC 440, Power PC 405, Power4, PowerPC970, Power5, Power6, and Power7. In step 308, for each functional module, an object file for the functional module is compiled for each target processor and for a generic processor. Thus a single functional module compilation will result in several target processor object files where an individual object file is suitable for running by its designated target processor. In step 310, a merge process is performed. This is a unique process for compilers in that the object code files for each functional module are merged to remove duplicate or similar object files. In other words, for a single functional module, providing several target processor object file versions, termed "target object version", these target object versions are evaluated to determine if any target object version is either a duplicate or similar to another target object version for that functional module. If so, the duplicate or similar target object version is deleted. In step 312, the remaining target object versions for each of the functional modules are then assembled into a collective object file output. This collective object file is provided to a linker in step 314 to link this collective object file output with any required libraries. Lastly the output of the linker in step 314 provides a composite object file in step 316.

In an alternate embodiment, a program is added to the object module file compilations from the compiler 300 before the Linker function 314 is performed. This program, termed 'stub' program, is further explained in FIG. 6.

When the composite object file is to be loaded into a target processor computer system for running, a loader 400 is used as is shown in FIG. 4. The composite object file is 402 is provided to the loader 400 and in step 404, for functional module a search is conducted to determine if a specified target processor object version is available. If yes, in step 406, that object module is then assembled in step 416 into an executable binary file. Then a search is conducted for the next functional module. This process continues the object module search for each functional module of the composite object file 402. Returning to step 406, if a target object version was not found in step 408 a search is conducted to determine if a similar target object version is available. If so, in step 410 this similar target object version placed in the executable binary file in step 416. If not, in step 412 a search is made a generic object version that would be executable by the target processor. If a generic object version is available, in step 414 this generic object version is added to the executable binary file in step 416. If no generic version is available in step 414, the user will be notified of a load failure. This notification means that a required object code module provided in the composite object file 402 was found and the program cannot load for running by the target processor. After step 416, upon assembly of each object file into the executable binary file, a determination is made whether all of the functional modules have provided a target object file to the executable binary file in step 418. If so, the process is complete. If not, the process returns to step 404 to continue with the next functional module. When the loading process is complete, the running begins for the executable binary file in step 420.

Figure 5:
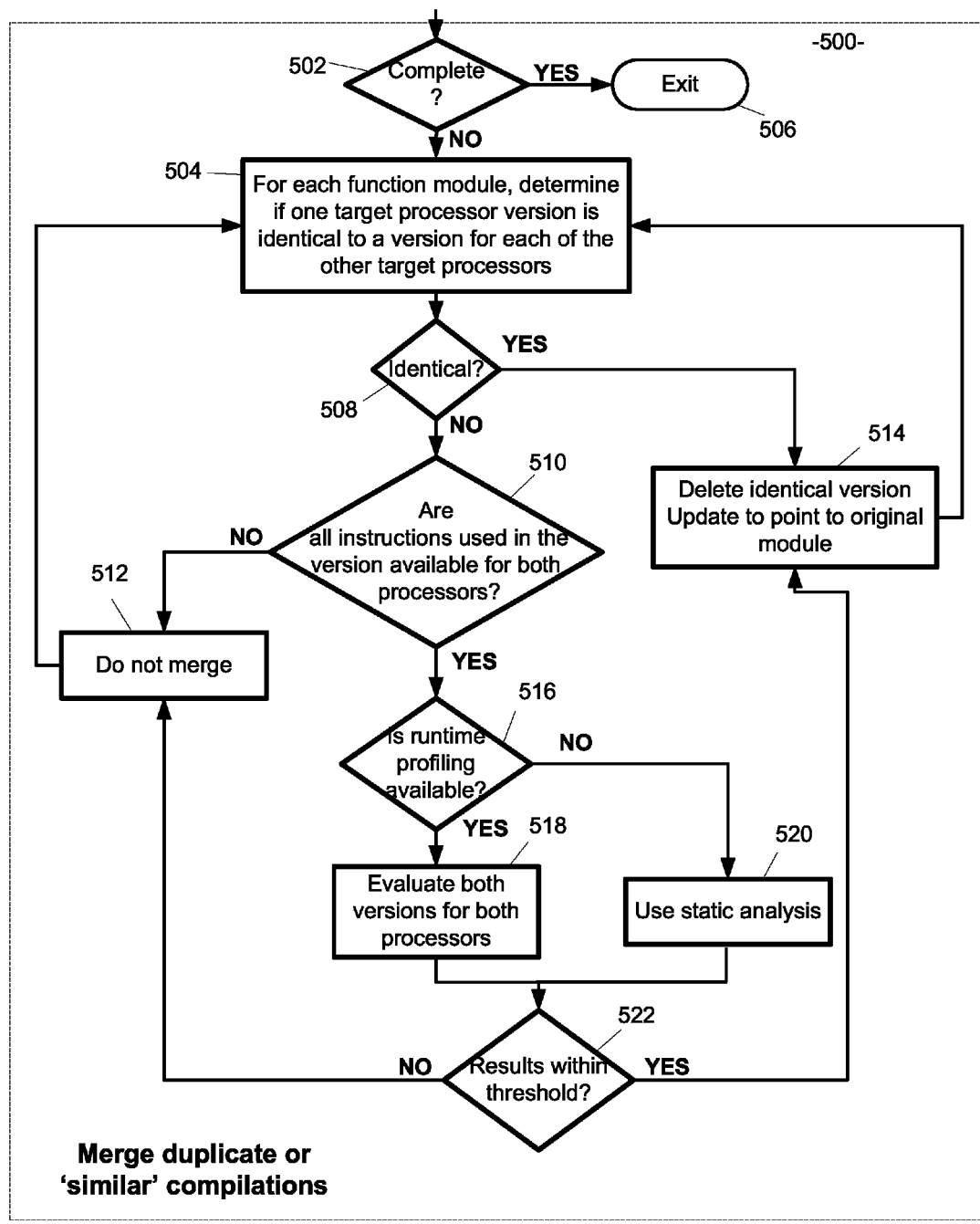
FIG. 5 is a flowchart of the emerging process.

FIG. 5 is an illustration of the merge process step 310 of FIG. 3. Step 310 of FIG. 3 is generally illustrated in block 500 of FIG. 5. In step 502, it is first determined as to whether all functional modules have evaluated for the merge process. If so, in step 506 the merge process is exited and the compiler process continues in step 312 of FIG. 3. However, if not, in step 504, for each functional module, a first target object version is selected and compared to another target object version for that functional module. In step 508, it is determined whether these two target object versions are identical. If so, in step 514 the identical version is deleted and the file updated to point to the original target object version. If not identical, in step 510, it is determined whether the instructions that are used by these versions are available on both target processors. If not, in step 512 the versions are not merged. Returning to step 510, if the instructions of the two target object versions are available for both target processors, in step 516, it is determined whether runtime profiling is available. Runtime profiling is a previously conducted analysis to determine the runtime performance each target object version. If runtime profiling is available, then in step 518 both versions are evaluated to determine which version would be the faster. If runtime profiling is not available, then static analysis is used in step 520 to determine which target object version use. In step 522, the results of runtime profiling in 518 or the results of the static analysis in 520 evaluated and compared to a threshold. For example, this threshold can be a user selectable percentage of a target performance such that a performance variation less than the variation threshold would still result in the modules being merged. If the results are not within the threshold then the two target object versions are not merged but if these the results are within the threshold, then the second target object version is deleted and the module pointer is updated accordingly in step 514.

Figure 6:
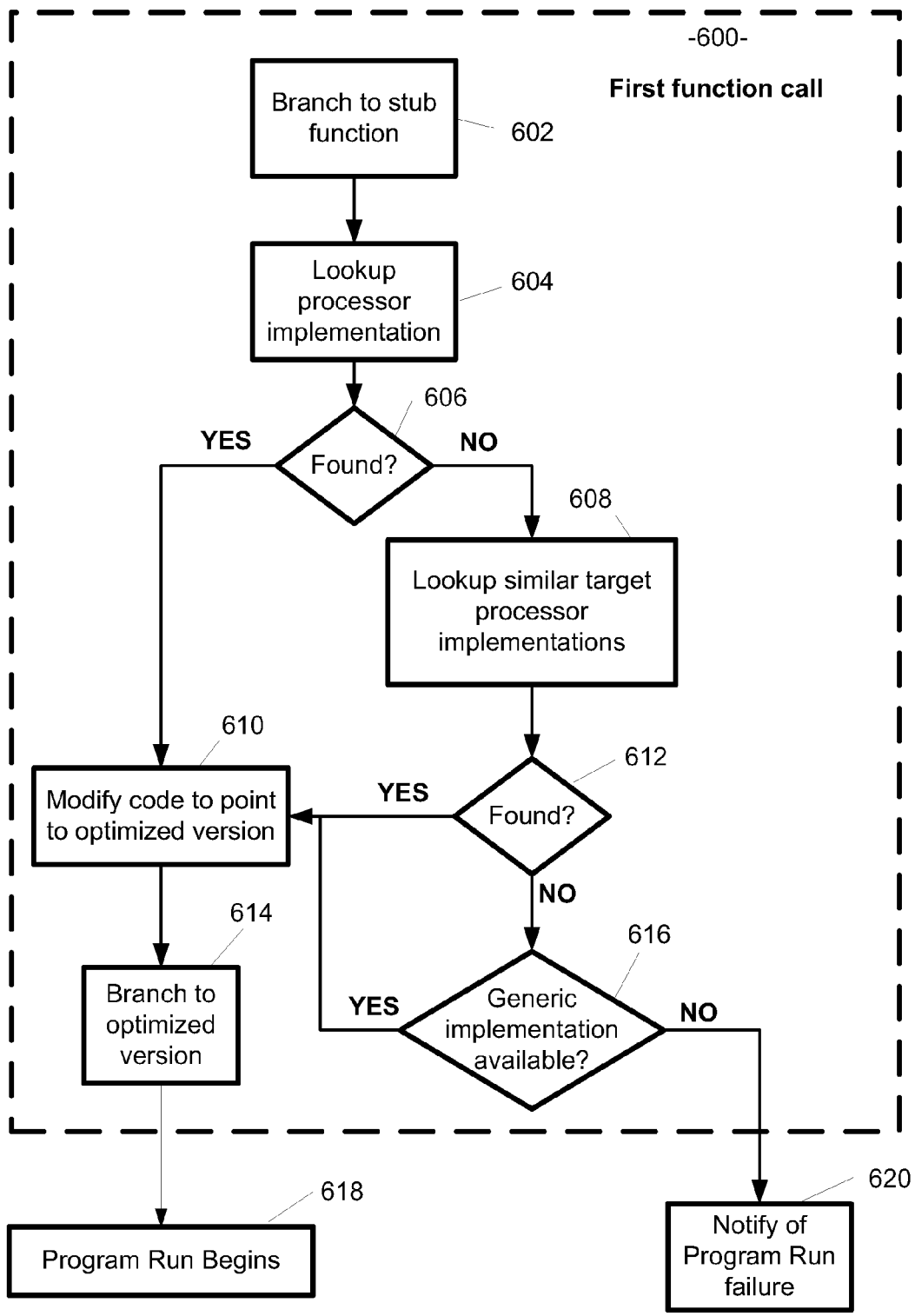
FIG. 6 is a flowchart of an alternate embodiment for the executable binary file loading process.

The process in FIG. 6 is an alternate embodiment of the loader process illustrated in FIG. 4. This embodiment does not require the Loader discussed in FIG. 4 but can utilize a traditional loader. In this embodiment, a 'stub' program 600 has been added to the object module file compilations as previously discussed. This 'stub' program performs the target version selection process when the compiled program is run. The first function to be run is to branch to the 'stub' program, in step 602, which determines, in step 604, if a version for the target processor is available. If so, in step 610 the composite object file is updated to point to that version and a branch is placed in the stub to point to this version in step 614. Returning to step 606, if a target object version for the target processor is not found, in step 608 the process determines whether a similar target processor implementation is available. In step 612 if such an implementation is found the binary file is modified to include a pointer to this version in step 610. If not, in step 616, a search is made for a generic version. Again, if a generic or implementation is available for process proceeds to step 610 which modifies the code to point to the appropriate target version to be run. If not, a notification of a program running failure is issued in step 620. In step 614, the program then branches to the appropriate target version for running in step 618.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method of compiling a source code program into a plurality of object code files for a plurality of target processors comprising the steps of:
   dividing the source code program into a plurality of functional modules;
   compiling each functional module into a plurality of target object versions, each target object version for one of the target processors;
   for each functional module, merging the target object versions by deleting any target object versions of that functional module that are identical to another target object version by 1) for each functional module, selecting a first target object version from the plurality of target object versions for that functional module,
2) deleting any target object versions of that functional module that are identical to the first target object version for that functional module, and
3) selecting a different first target object version for that functional module and repeating step 2) until all functional module target object versions for all functional modules have been selected or deleted; and after merging, forming a composite object code file of all function module target object versions.

2. A method according to claim 1 further including the step of linking the composite object code file with linked libraries.

3. A method according to claim 1 wherein the merging step further includes the sub steps of 1) for each functional module, selecting a first target object version and determining if any of the other target object versions for that functional module include the same instruction types as for the first target object version, and, if not, 2) selecting a different first target object version and repeating step 1), and, if so, 3) determining if a runtime profile is available for the two target object versions, and if so, determining which target object version would run the faster and deleting the other target object version, or, if no runtime profile is available, determining from a static analysis which is a slower predicted running of the two target object versions from the static analysis and deleting the slower target object version.

4. A method according to claim 2 further including the step of providing a stub program in the composite object code file positioned to be run before the running of the composite object code file.

5. A method according to claim 4 wherein said stub program further includes the method for an executing target processor to determine a selected target object version for each functional module and, pointing to the selected target object version for running.

6. A system for compiling a source code program into a plurality of object code files for a plurality of target processors comprising:
   a processor;
   a memory connected to the processor and including program code for (1) dividing the source code program into a plurality of functional modules, (2) compiling each functional module into a plurality of target object versions, each target object version for one of the target processors, (3) for each functional module, merging the target object versions by deleting any target object versions of that functional module that are identical to another target object version by
      a) for each functional module, selecting a first target object version from the plurality of target object versions for that functional module,
      b) deleting any target object versions of that functional module that are identical to the first target object version for that functional module, and
      c) selecting a different first target object version for that functional module and repeating step b) until all functional module target object versions for all functional modules have been selected or deleted; and
   (4) after merging, forming a composite object code file of all function module target object versions; and
   an input/output device having computer readable storage medium storing the composite object code file.

7. A computer program product for compiling a source code program into a plurality of object code files for a plurality of target processors, the computer program product comprising:
   a computer readable storage medium;
   first program instructions to divide the source code program into a plurality of functional modules;
   second program instructions to compile each functional module into a plurality of target object versions, each target object version for one of the target processors;
   third program instructions, for each functional module, to merge the target object versions by deleting any target object versions of that functional module that are identical to another target object version by
      a) selecting for each functional module, a first target object version from the plurality of target object versions for that functional module,
      b) deleting any target object versions of that functional module that are identical to the first target object version for that functional module, and
      3) selecting a different first target object version for that functional module and repeating step b) until all functional module target object versions for all functional modules have been selected or deleted; and
   fourth program instructions to, after merging, form a composite object code file of all function module target object versions wherein said first, second, third, and fourth program instructions are stored on said computer readable storage medium.

8. The computer program product of claim 7 further including fifth program instructions to link the composite object code file with linked libraries.

9. The computer program product of claim 8 wherein the third program instructions further include instructions to 1) select for each functional module, a first target object version from the plurality of target object versions for that functional module, 2) delete any target object versions of that functional module that are identical to the first target object version for that functional module, and 3) select a different first target object version for that functional module and repeating step 2) until all functional module target object versions for all functional modules have been selected or deleted.

10. The computer program product of claim 8 further including sixth program instructions to provide a stub program in the composite object code file positioned to be run before the running of the composite object code file.

11. The computer program product of claim 10 wherein the sixth program instructions further provides a method for an executing target processor to determine a selected target object version for each functional module and, pointing to the selected target object version for running.

* * * * *